US006786378B2

(12) United States Patent
Wagdy et al.

(10) Patent No.: US 6,786,378 B2

(45) Date of Patent: Sep. 7, 2004

(54) FASTENER TOOL HAVING AUXILIARY FUEL CELL METERING VALVE STEM SEAL ADAPTOR

(75) Inventors: Mohamed K. Wagdy, Arlington Heights, IL (US); Valery H. Vanstaan, Highland Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/042,895

(22) Filed: Jan. 9, 2002

(65) Prior Publication Data

US 2003/0127488 A1 Jul. 10, 2003

(51) Int. Cl.[7] .............................. B25C 1/04; B25C 1/08; F16L 55/00

(52) U.S. Cl. .............................. 227/9; 227/10; 227/130; 285/198.23; 123/46 SC

(58) Field of Search .............................. 227/9, 10, 130; 123/46 SC; 285/3, 148.23

(56) References Cited

U.S. PATENT DOCUMENTS

| | | | | |
|---|---|---|---|---|
| 4,403,722 A | | 9/1983 | Nikolich | |
| 4,483,473 A | | 11/1984 | Wagdy | |
| 4,483,474 A | | 11/1984 | Nikolich | |
| 4,522,162 A | | 6/1985 | Nikolich | |
| 5,115,944 A | | 5/1992 | Nikolich | |
| 6,102,270 A | * | 8/2000 | Robinson | 227/10 |
| 6,217,085 B1 | | 4/2001 | Toulouse | |
| 6,302,297 B1 | * | 10/2001 | Richardson et al. | 222/1 |
| 6,371,338 B1 | | 4/2002 | Klein et al. | |
| 6,523,860 B1 | * | 2/2003 | Shkolnikov et al. | 285/3 |

FOREIGN PATENT DOCUMENTS

| | | |
|---|---|---|
| DE | 199 50 352 | 10/1999 |
| DE | 100 07 211 | 2/2000 |
| DE | 100 28 555 | 9/2000 |
| EP | 1 093 888 | 1/1999 |
| EP | 1 093 887 | 10/1999 |
| EP | 1 197 299 | 4/2002 |

* cited by examiner

*Primary Examiner*—Scott A. Smith
*Assistant Examiner*—Brian Nash
(74) *Attorney, Agent, or Firm*—Schwartz & Weinrieb

(57) ABSTRACT

An auxiliary elastomeric sealing adaptor is disclosed which effectively provides a high degree of sealing, and prevents fuel leakage, between the metering valve stem and the tool stem components of a fuel-cell powered fastener-driving tool despite bending, tilting, or pivotal movements of the metering valve stem attendant a fastener-firing operation. In addition, the incorporation of the elastomeric adaptor between the stem components reduces the need for high tolerance manufacturing techniques and also enhances the service lives of the stem components. The sealing adaptor is mounted upon the free or distal end portion of the metering valve stem and is seated within a counterbored region of the fastener-driving tool stem.

12 Claims, 5 Drawing Sheets

FASTENER TOOL HAVING AUXILIARY FUEL CELL METERING VALVE STEM SEAL ADAPTOR

FIELD OF THE INVENTION

The present invention relates generally to fastener-driving tools, and more particularly to a new and improved seal adaptor which is structured so as to effectively interface between the outwardly projecting valve stem of a metering valve operatively associated with a fuel cell power supply for the fastener-driving tool, and a tool stem of the fastener-driving tool whereby secure sealed conditions are always maintained between the metering valve stem and the tool stem regardless of the disposition or orientation of the fuel cell with respect to the tool during the normal operative cyclical firing of the fastener-driving tool.

BACKGROUND OF THE INVENTION

Fuel cells are conventionally used as a power supply or a source of power for fastener-driving tools. Examples of fuel cells, and fastener-driving tools utilizing the same, are disclosed within U.S. Pat. No. 5,115,944 which issued to Nikolich on May 26, 1992, U.S. Pat. No. 4,522,162 which issued to Nikolich on Jun. 11, 1985, U.S. Pat. No. 4,483,474 which issued to Nikolich on Nov. 20, 1984, U.S. Pat. No. 4,483,473 which issued to Wagdy on Nov. 20, 1984, and U.S. Pat. No. 4,403,722 which issued to Nikolich on Sep. 13, 1983.

Briefly, as illustrated within FIG. 1, a typical fuel-cell powered fastener-driving tool is partially disclosed and is generally indicated by the reference character 10. The tool 10 comprises a combustion chamber 12 within which an air-fuel mixture distribution fan 14 is disposed, and a fuel charge conduit 16 is defined within the head 18 of a cylinder block 19. The fuel cell is disclosed at 20 and is provided with a dispensing valve unit 22. Dispensing valve unit 22 has, in turn, a metering valve unit 24 operatively connected thereto wherein the latter is adapted to discharge, dispense, or inject a predetermined amount or dosage of fuel from the fuel cell 20 into the tool combustion chamber 12 each time a fastener-driving and firing operational cycle is initiated. The metering valve unit 24 comprises a valve stem 26, and the tool 10 further comprises a tool stem 28 which is fluidically connected at one end thereof to the fuel charge conduit 16, and is operatively engaged at its opposite end to the metering valve stem 26 so as to provide a fluidic flow path from the fuel cell 20, the dispensing valve unit 22, and the metering valve unit 24 into the tool combustion chamber 12. As best seen further in FIGS. 2 and 3, the tool stem 28 comprises a axial stem portion 30 which is provided with an axial bore 32 defining a fluid passageway for the fuel to be dispensed into the tool combustion chamber 12, and a head end portion 34 which is adapted to be engaged with the free end portion of the metering valve stem 26. More particularly, the head end portion 34 of the tool stem 28 is provided with a counterbored region 36 within which the free end portion of the metering valve stem 26 is adapted to be received or seated.

This structural system operates substantially satisfactorily, however, since both the valve stem 26 and the tool stem 28 are fabricated either from, for example, a suitable plastic material or from a suitable metal material, the two components are operatively engaged with each other so as to effectively establish either a plastic-to-plastic contact or engagement interface or a metal-to-metal contact or engagement interface. Accordingly, a fluidically sealed interface between the valve stem 26 and tool stem 28 components is not in fact capable of being established.

In view of the fact that the valve stem 26 and tool stem 28 elements cooperate together so as to effectively form or establish the necessary fuel conduit interface, as well as the necessary fluidic sealing of such conduit interface as determined by means of the interengagement of such stem elements 26,28, high manufacturing tolerances are required in connection with the fabrication of such stem elements 26,28 in order to achieve, as best as possible, the aforenoted sealing function between the stem elements 26,28. Still further, the interengagement of the valve stem 26 and tool stem 28 components limits the necessary movements of the fuel cell 20 and the metering valve 24 components within the tool 10. Lastly, the constant or repetitive pivotal movements of the valve stem 26 with respect to the tool stem 28, as a result of the initiation of each successive fastener-firing operational cycle and while maintaining the aforenoted fluidic interface therebetween, causes the valve stem 26, as well as the tool stem 28, to undergo bending stresses or strains which can lead to structural fatigue, cracking, breakage, failure, and additional fuel leakage within the tool 10.

A need therefore exists in the art for a new and improved fuel cell powered fastener-driving tool, as well as a new and improved auxiliary fuel cell metering valve stem seal adaptor for use in conjunction with the fuel cell metering valve stem and the tool valve stem as a seal interface therebetween, wherein the auxiliary fuel cell metering valve stem seal adaptor will enable improved and reliable sealing to be achieved between the metering valve stem and the tool stem whereby such reliable sealing between such stem components can be ensured and maintained despite the normal tilted movements of the fuel cell during the initiation of each fastener-driving operational cycle. In this manner, fuel leakage internally within the tool can be effectively prevented. In addition, manufacturing tolerances of the components do not need to be as rigid, and the provision of the seal adaptor readily permits movement of the fuel cell and its operatively associated metering valve without inducing stresses and strains upon the metering valve stem-tool stem connection. Accordingly, fatigue, fracture, and failure of the components are eliminated with a consequent enhancement of the service life of the metering valve and tool stem components. Lastly, it is desirable to be able to achieve these various needs in the simplest and most cost-effective manner possible.

OBJECTS OF THE INVENTION

Accordingly, it is an object of the present invention to provide a new and improved auxiliary fuel cell metering valve stem seal adaptor for use in conjunction with the fuel cell metering valve stem and the tool valve stem of a fuel cell powered fastener-driving tool.

Another object of the present invention is to provide a new and improved auxiliary fuel cell metering valve stem seal adaptor for use in conjunction with the fuel cell metering valve stem and the tool valve stem of a fuel cell powered fastener-driving tool wherein the operational drawbacks and deficiencies of conventional operative engagement structure defined between the metering valve stem and the tool stem of PRIOR ART fuel cell powered fastener-driving tools can effectively be overcome.

An additional object of the present invention is to provide a new and improved auxiliary fuel cell metering valve stem seal adaptor for use in conjunction with the fuel cell metering valve stem and the tool valve stem of a fuel cell powered fastener-driving tool wherein enhanced sealing characteristics or properties are able to be achieved between the metering valve stem and the tool valve stem.

A further object of the present invention is to provide a new and improved auxiliary fuel cell metering valve stem seal adaptor for use in conjunction with the fuel cell metering valve stem and the tool valve stem of a fuel cell powered fastener-driving tool wherein enhanced sealing characteristics or properties are able to be achieved between the metering valve stem and the tool valve stem such that fuel leakage internally within the fastener-driving tool is effectively prevented.

A last object of the present invention is to provide a new and improved auxiliary fuel cell metering valve stem seal adaptor for use in conjunction with the fuel cell metering valve stem and the tool valve stem of a fuel cell powered fastener-driving tool wherein enhanced sealing characteristics or properties are able to be achieved between the metering valve stem and the tool valve stem such that bending stresses, strain, and fatigue are no longer impressed upon the metering valve stem and the tool stem components so as to respectively enhance the service lives thereof.

SUMMARY OF THE INVENTION

The foregoing and other objectives are achieved in accordance with the teachings and principles of the present invention through the provision of a new and improved auxiliary fuel cell metering valve stem seal adaptor for use in conjunction with a fuel cell metering valve stem and a tool valve stem, of a fuel cell powered fastener-driving tool, as a seal interface between the metering valve stem and the tool stem, wherein the seal adaptor comprises, in effect, an annular cap which is adapted to be mounted upon the free distal end portion of the metering valve stem. The seal adaptor is fabricated from a suitable elastomer material, it has a substantially cylindrical configuration, and the free sealing end of the seal adaptor has a substantially frusto-conical configuration wherein substantially the entire seal adaptor is adapted to be seated within a similarly configured recessed portion of the tool stem. Accordingly, the seal adaptor is readily capable of a combination of rotational and pivotal movements relative to the tool stem and attendant the activation of the metering valve in conjunction with a fastener-firing and discharge operational cycle, while nevertheless maintaining the desired sealed state between the metering valve stem and the tool stem.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 4:
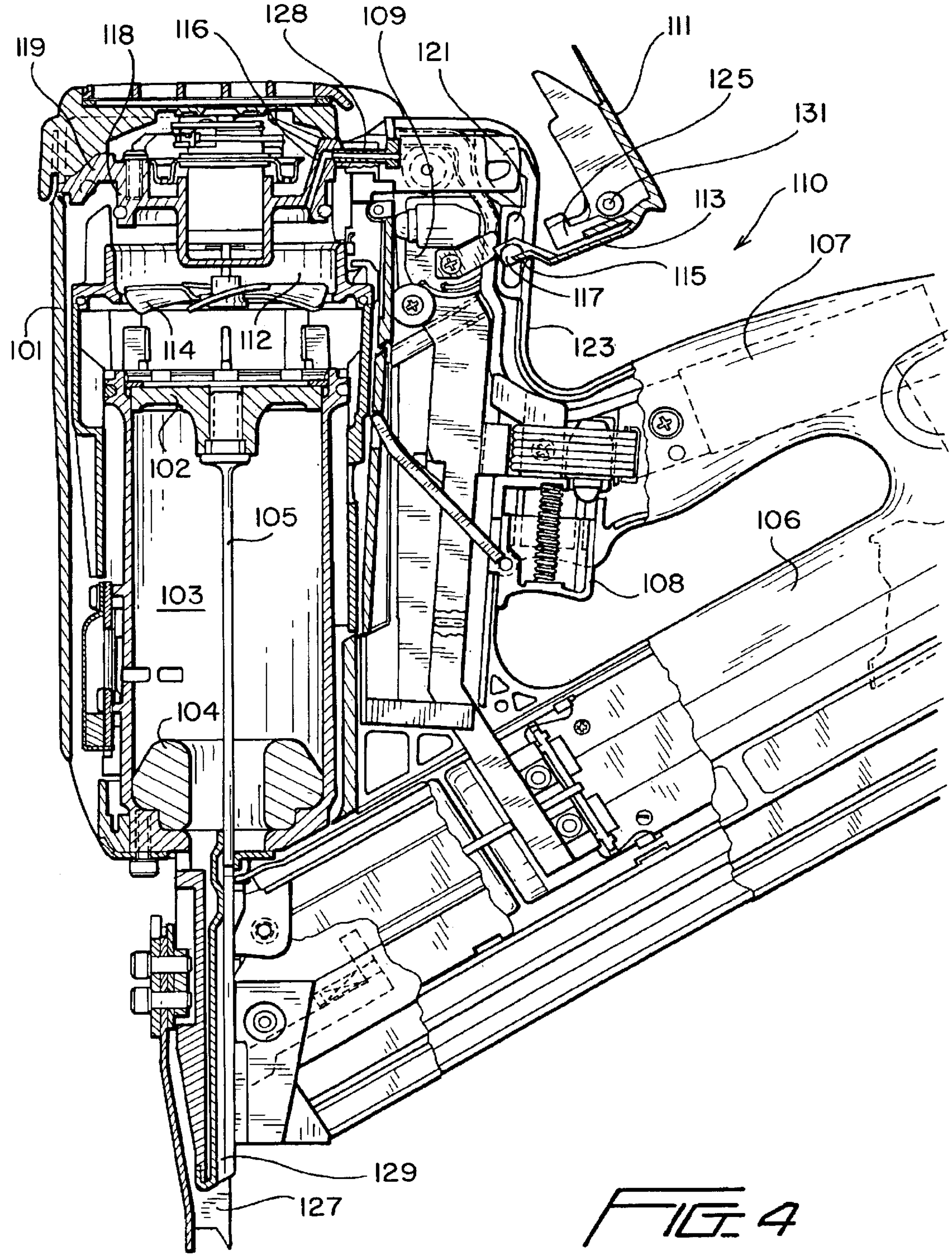
FIG. 4 is a partial vertical cross-sectional view of a fuel cell-powered fastener-driving tool within which the new and improved auxiliary fuel cell metering valve stem seal adaptor, constructed in accordance with the principles and teachings of the present invention, can be utilized.

Referring now to the drawings, and more particularly to FIG. 4 thereof, a fuel cell-powered fastener-driving tool, within which the new and improved auxiliary fuel cell metering valve stem seal adaptor, constructed in accordance with the principles and teachings of the present invention can be utilized, is disclosed and is generally indicated by the reference character 110. The tool 110 illustrated within FIG. 4 is similar to the tool 10 illustrated within FIG. 1 and therefore component parts of the tool 110 which correspond to those component parts of the tool 10 will be designated by corresponding reference characters except that the reference characters for the component parts of the tool 110 will be within the 100 series.

Accordingly, and briefly, since such a fastener-driving tool is well-known in the art and industry, the fastener-driving tool 110 is seen to comprise a body portion 101 having a combustion chamber 112 defined therein within which an air-fuel mixture distribution fan 114 is located. A piston 102 is vertically movable within a piston chamber 103 and a bumper member 104 is located within the bottom end portion of the piston chamber 103 to serve as a shock-absorber for the piston 102 at the end of its downward movement or stroke. The piston 102 has a driver blade 105 operatively connected thereto for driving and discharging nail fasteners out of the tool 110 and into a workpiece or substrate, and the nail fasteners are housed in a collated manner within a tool magazine 106 which is integrally connected to a tool handle portion 107 of the tool 110 within which a tool-firing trigger mechanism 108 is mounted. A fuel cell chamber 109 is defined between the handle portion 107 of the tool 110 and the combustion chamber 112 so as to house a fuel cell, not shown in FIG. 4, which is similar to the fuel cell 20 disclosed within the conventional PRIOR ART tool 10 shown in FIG. 1. The fuel cell, not shown, will also have a metering valve assembly 124, also not shown in FIG. 4 but shown in FIG. 5, operatively connected thereto, and the metering valve assembly 124 has a valve stem 126 which is adapted to be operatively mated with a tool stem 128 which is disclosed in detail in FIG. 6. The valve stem 126 is in turn fluidically connected to a fuel charge conduit 116 defined within the head 118 of a cylinder block 119.

The fuel cell chamber 109 is provided with a pivotal cover member 111, and it is seen that the fuel cell chamber cover member 111 comprises a mounting bracket portion 113 which has a lower end section 115 pivotally mounted upon a first trunnion 117. The first trunnion 117 is also vertically slidable within a slot 121 formed within the fuel cell chamber housing 123, and the cover member 111 also includes a dependent leg portion 125 which is connected, but separately and independently movable with respect, to the mounting bracket portion 113. The fastener-driving tool 110 is further provided with a workpiece contacting element 127 which is movably mounted upon a nosepiece portion 129 of the tool 110 as is well-known in the art, and the workpiece contacting element 127 is operatively connected to the fuel cell cover member 111, by means not shown, such that when the fuel cell cover member 111 is disposed in its CLOSED position and the workpiece contacting element 127 is moved relatively upwardly as a result of the tool 110 being moved relatively downwardly into engagement with a workpiece or substrate into which the nail fasteners are to be driven, the fuel cell cover member 111 will be pivotally moved around a second trunnion 131 such that the dependent leg portion 125 of the fuel cell cover member 111 will cause movement of the metering valve 124 relative to the metering valve stem 126 so as to inject a predetermined dosage of fuel from the fuel cell into the combustion chamber 112. Subsequently, when the tool trigger member 108 is actuated, the fastener-driving tool 110 is fired, as a result of the air-fuel mixture within the combustion chamber 112 being ignited, thereby driving a fastener into the workpiece or substrate.

Figure 1:
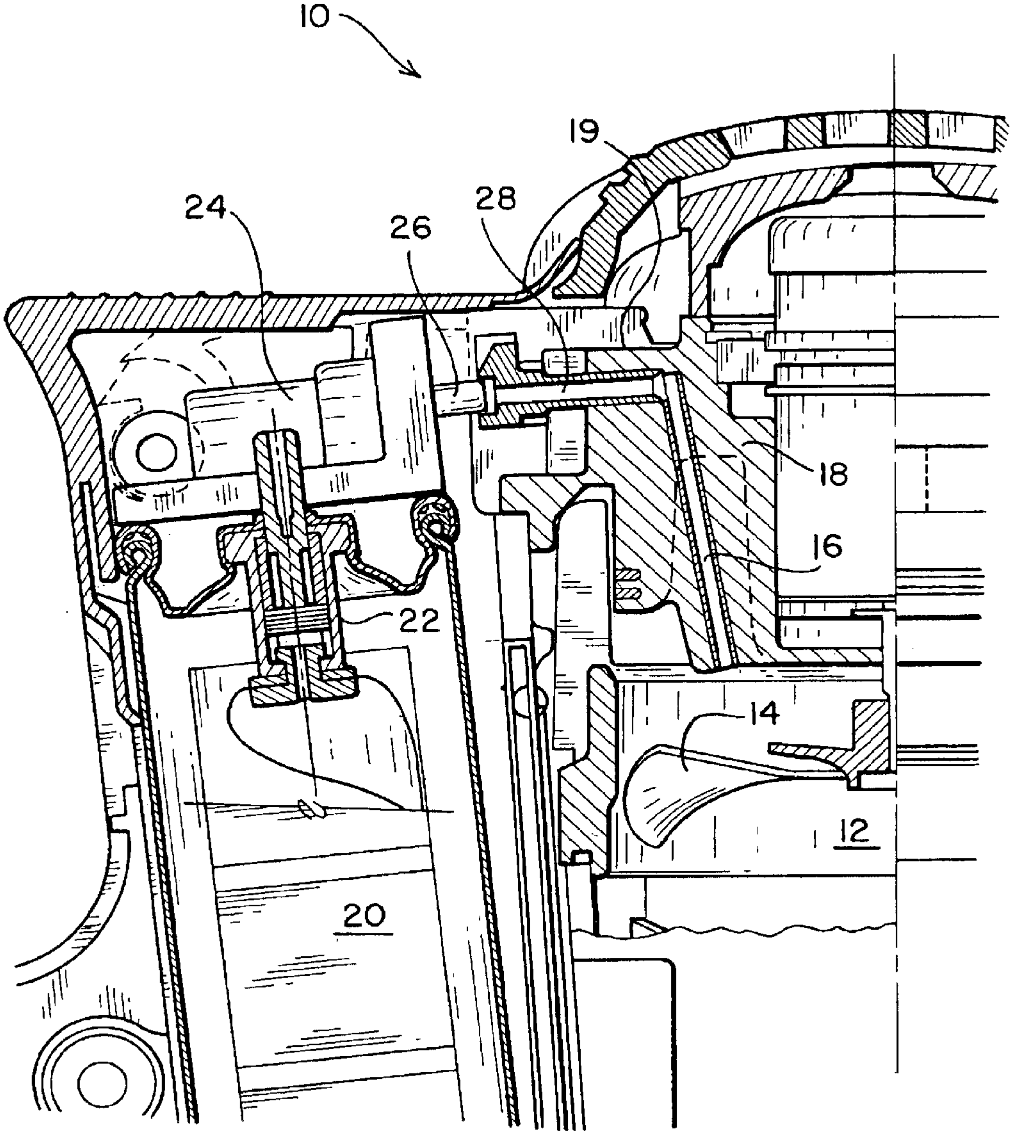
FIG. 1 (PRIOR ART)
FIG. 1 is a partial vertical cross-sectional view of a conventional PRIOR ART fuel-cell powered fastener-driving tool showing the disposition of the fuel cell, the metering valve, the metering valve stem, and the tool stem as mounted within the fastener-driving tool.
Figure 2:
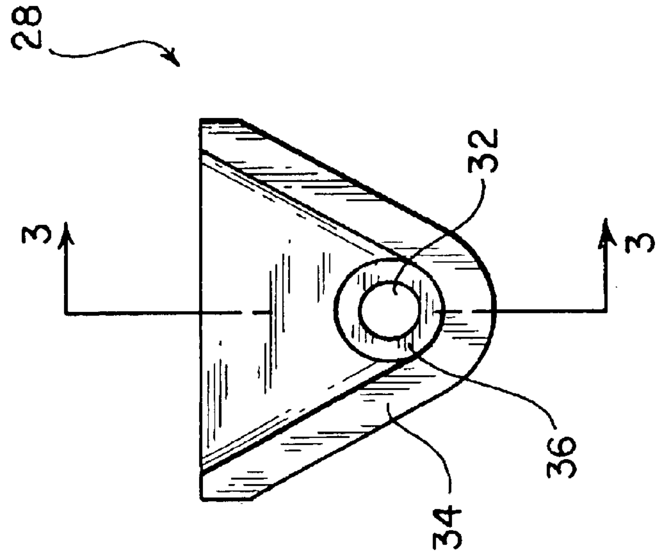
FIG. 2 (PRIOR ART)
FIG. 2 is an end elevational view of a conventional PRIOR ART tool stem as used within the fastener-driving tool illustrated within FIG. 1.
Figure 3:
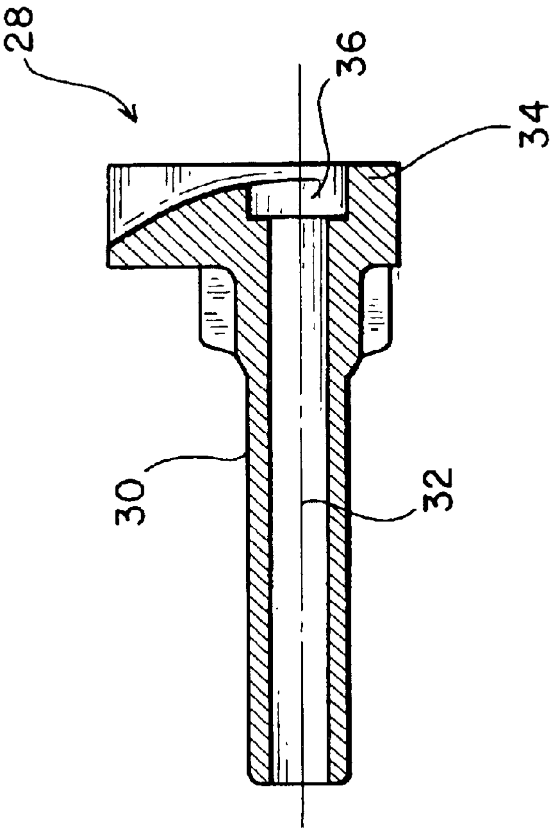
FIG. 3 (PRIOR ART)
FIG. 3 is a cross-sectional view of the PRIOR ART tool stem illustrated within FIG. 2 as taken along the lines 3—3 of FIG. 2.
Figure 5:
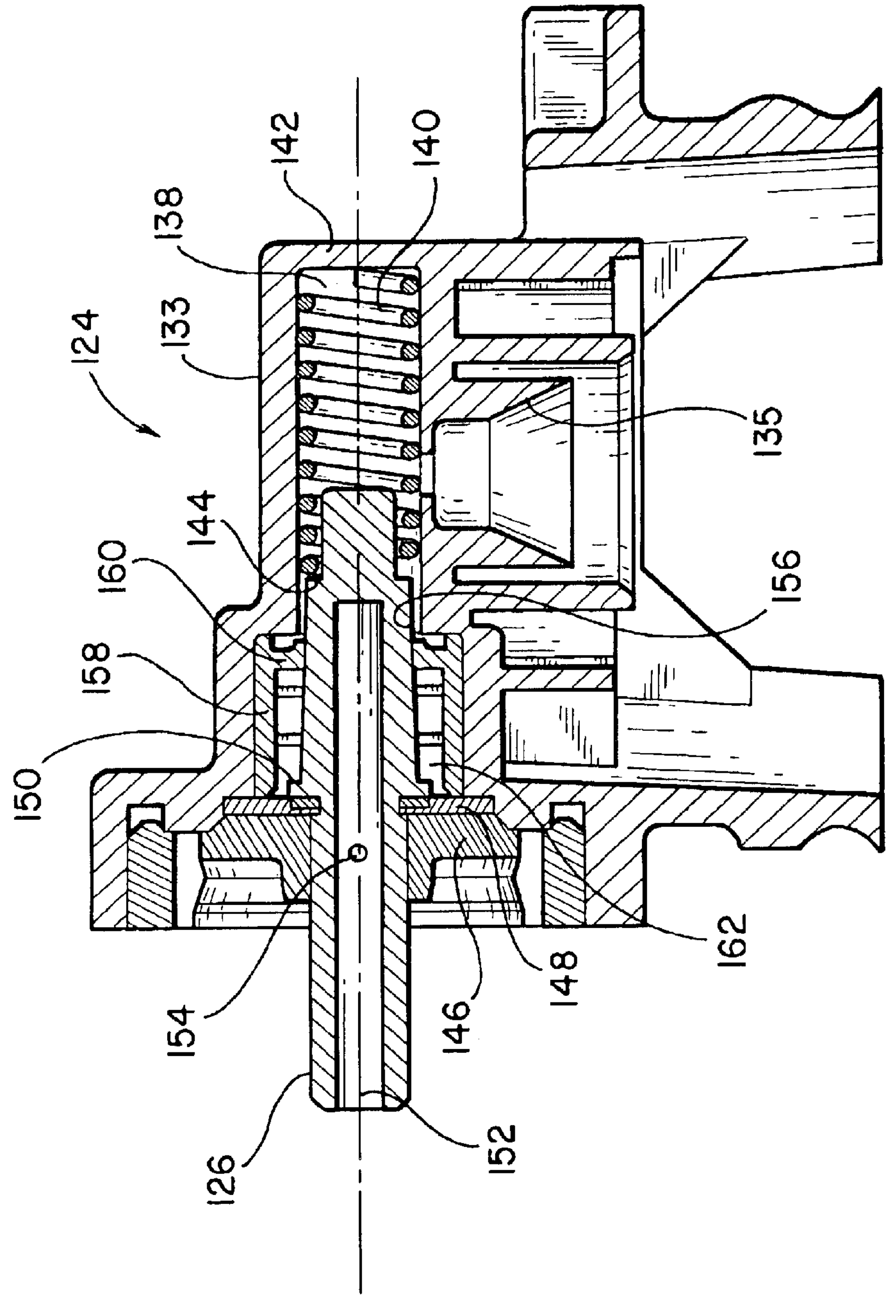
FIG. 5 is a cross-sectional view of a metering valve assembly which is used in conjunction with the fuel cell power supply of the fastener-driving tool illustrated within FIG. 4.

With reference now being made to FIG. 5, the metering valve assembly 124 is seen to comprise a main housing 133 upon which a female connector portion 135 is integrally provided for fluidic connection to a dispensing valve similar to the dispensing valve 22 of the fuel cell 20 as shown in FIG. 1. The metering valve stem is disclosed at 126 and it is seen that and internally disposed end of the metering valve stem 126 is disposed within a chamber 138. A coil spring 140 is disposed within the chamber 138 such that one end of the coil spring 140 is fixedly engaged with an internal surface portion of an end wall 142 of the housing 133, while the other end of the coil spring 140 is engaged with a shoulder portion 144 of the metering valve stem 126. A plug 146 is fixedly mounted within the open end of the metering valve housing 133 so as to secure a gasket member 148 within the housing 133. The metering valve stem 126 further comprises an annular flanged portion 150, and as a result of the biasing force of the spring 140, the flanged portion 150 of the metering valve stem 126 is normally seated upon the gasket member 148 so as to normally prevent fuel flow through the metering valve stem 126. The metering valve stem 126 further comprises an axially extending fluid bore 152, and a transverse through-bore 154. It is also seen that the upstream shank portion of the metering valve stem 126 is tapered as at 156, and an annular seal member 158, having an annular sealing rib 160, is disposed within a fuel metering chamber 162 wherein the annular sealing rib 160 is normally loosely disposed in contact with the outer peripheral surface portion of the tapered metering valve stem shank portion 156. Consequently, when the fastener-driving tool 110 has not as yet been activated, fuel from a fuel cell such as that disclosed at 20 in FIG. 1 is dispensed through its dispensing valve 22, into spring chamber 138, and into fuel metering chamber 162. When the fastener-driving tool 110 is activated, fuel cell 20 is tilted or pivoted so as to in turn tilt or pivot metering valve assembly 124 in the counterclockwise direction whereby the housing 133 is effectively moved toward the left as viewed in FIG. 5 such that the metering valve stem 126 moves toward the right as viewed in FIG. 5, it being remembered that metering valve stem 126 is engaged with the tool stem 128. As a result of the relative movement of the metering valve stem 126 toward the right as viewed in FIG. 5, annular sealing rib 160 now engages the relatively large diameter portion of the metering valve stem shank portion thereby sealing the particular dose of fuel within chamber 162. Flanged portion 150 is also unseated from gasket member 148, and transverse bore 154 is moved beyond the vertical plane of gasket member 148 so as to receive the fuel from chamber 162 and thereby permit the fuel to be conducted toward the tool stem 128 by means of axial bore 152.

Figure 7:
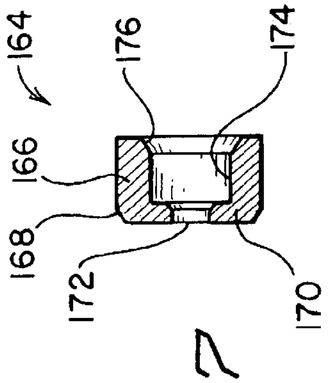
FIG. 7 is a cross-sectional view of a new and improved auxiliary fuel cell metering valve stem seal adaptor, constructed in accordance with the principles and teachings of the present invention, which is adapted to provide fluidic sealing between the metering valve stem of the metering valve assembly shown in FIG. 5 and the tool stem illustrated in FIG. 6.
Figure 8:
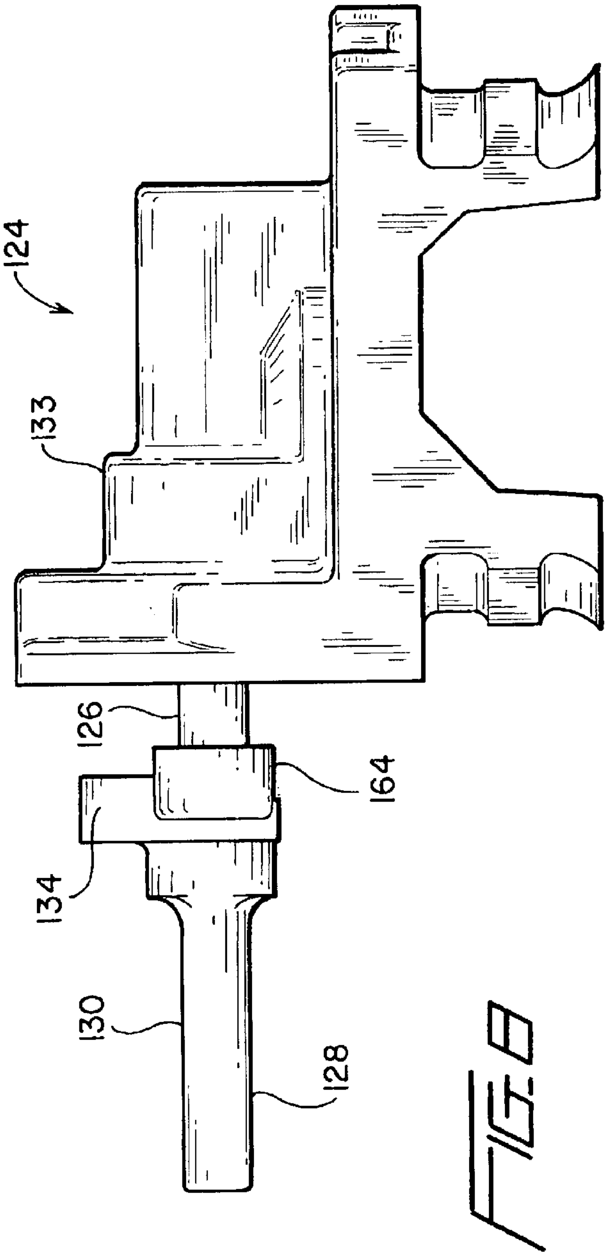
FIG. 8 is a side elevational view, partly in cross-section, illustrating the sealed assembly arrangement defined by means of the auxiliary fuel cell metering valve stem seal adaptor illustrated within FIG. 7 when interposed between the metering valve stem of the metering valve assembly of FIG. 5 and the tool stem of FIG. 6.

As has been noted hereinbefore, when the fuel is conducted from the metering valve stem 126 to the tool stem 128, normally the interface defined between such stem components simply comprises a plastic-to-plastic or metal-to-metal interface whereby fuel leakage can occur. This is an undesirable operative situation, and it is therefore desired to prevent such fuel leakage at the operative interface defined between the metering valve stem 126 and the tool stem 128. In accordance with the principles and teachings of the present invention, an auxiliary elastomeric sealing adaptor has been developed so as to be fixedly mounted upon the free distal end portion of the metering valve stem 126 and to be accommodated within the upstream head portion of the tool stem 128 so as to provide a fluidic seal between the metering valve stem 126 and the tool stem 128. More particularly, as can be appreciated from FIGS. 6–8, the auxiliary elastomeric sealing adaptor is disclosed at 164. As best seen from FIG. 7, the elastomeric adaptor 164 comprises a substantially hollow or tubular body portion 166 having a substantially cylindrical cross-sectional configuration, while the forward or downstream end portion 168 of the adaptor 164 is chamfered so as to have a substantially annular frusto-conical configuration. The front end wall 170 of the adaptor 164 is provided with a through-bore 172, and the body portion 166 is counterbored as at 174 so as to permit the elastomeric adaptor 164 to be mounted upon the free or distal end portion of the metering valve stem 126 as can be best appreciated from FIG. 8. The entrance to the counterbored portion 174 of the adaptor 164 is chamfered as at 176 so as to facilitate the mounting of the adaptor upon the metering valve stem 126.

Figure 6:
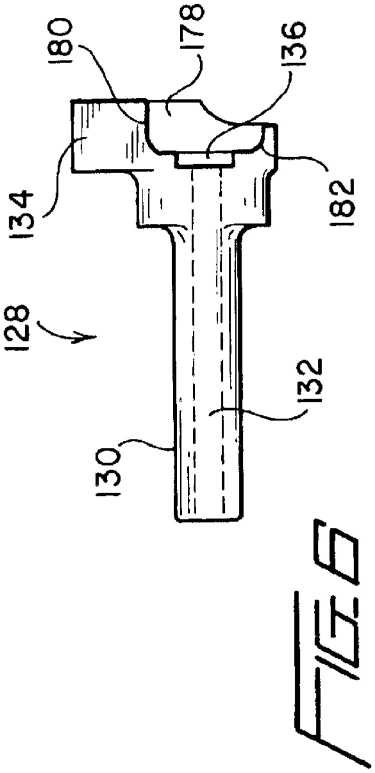
FIG. 6 is a side elevational view, partly in cross-section, of a new and improved tool stem constructed in accordance with the principles and teachings of the present invention and adapted to be used in connection with the the metering valve stem of the metering valve assembly illustrated within FIG. 5.

In a similar manner, as can best be appreciated from FIG. 6, it is seen that the structure of the tool stem 128 has been somewhat modified when compared to the structure of the conventional PRIOR ART tool stem 28 in that the upstream head portion 134 of the tool stem 128 has an enlarged counterbored section 178 defined therein so as to be capable of effectively accommodating the elastomeric adaptor 164. In particular, the configuration of the counterbored section 178 is such as to effectively match the cylindrical and frusto-conical portions 166,168 of the adaptor 164 so as to facilitate the fluidic sealing engagement between the elastomeric adaptor 164 and the tool stem 128. Accordingly, counterbored section 178 of tool stem head section 134 is seen to comprise a substantially cylindrical portion 180 and a frusto-conical portion 182, and the mated engagement or mounted position of the adaptor 164 within the tool stem 128 is best appreciated from FIG. 8. It can therefore be appreciated that when the metering valve stem 126 undergoes tilted or pivotal movement with respect to the longitudinal axis of the tool stem 128, the frusto-conical portion 168 of the elastomeric adaptor 164, as seated within the corresponding frusto-conical portion 182 of the tool stem 128 will enable such tilting or pivotal movement to occur in a substantially universal movement mode is necessary while nevertheless maintaining the sealed engagement between the metering valve stem 126 and the tool 128 as afforded by means of the elastomeric adaptor 164.

Thus, it may be seen that in accordance with the teachings and principles of the present invention, there has been provided a new and improved auxiliary elastomeric sealing adaptor which effectively provides a high degree of sealing, and prevents fuel leakage, between the metering valve stem and the tool stem components of a fuel-cell powered fastener-driving tool despite bending, tilting, or pivotal movements of the metering valve stem attendant a fastener-firing operation. In addition, the incorporation of the elastomeric adaptor between the stem components reduces the need for high tolerance manufacturing techniques and also enhances the service lives of the stem components.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A metering valve assembly, for use in connection with a tool stem of a fastener-driving tool, for dispensing a predetermined metered amount of fuel from a fuel source into a combustion chamber of the fastener-driving tool, comprising:

a metering valve operatively connected at an intake end thereof to a fuel source for dispensing a predetermined metered amount of fuel from the fuel source toward a tool combustion chamber;

a metering valve stem fixedly mounted upon a discharge end of said metering valve and adapted to fluidically cooperate with a tool stem of a fastener-driving tool, wherein the tool stem defines a fluid flow path for delivering the predetermined metered amount of fuel from said metering valve stem, through the tool stem, and into the tool combustion chamber; and an elastomeric adaptor mounted upon said metering valve stem and adapted to be disposed in sealed engagement with the tool stem of the fastener-driving tool so as to thereby define a sealed fluid flow path leading from said metering valve and toward the tool combustion chamber regardless of relative movements that may occur between said metering valve stem and the tool stem, said elastomeric adaptor comprising a tubular body portion defined around a longitudinal axis, a counterbored region defined within said tubular body portion for housing a forward end portion of said metering valve stem and having a front end wall portion, disposed substantially perpendicular to said longitudinal axis of said tubular body portion, for providing an internal wall surface for abutment with a front end face of said forward end portion of said metering valve stem so as to properly seat said forward end portion of said metering valve stem internally within said counterbored region of said tubular body portion, and a frusto-conically configured, annular edge portion formed upon an external wall surface of said front end wall portion of said tubular body portion for mated engagement with a correspondingly configured end wall of the tool stem so as to provide a universal sealed interface with the tool stem of the fastener-driving tool regardless of relative movements that may occur between said metering valve stem and the tool stem.

2. The metering valve assembly as set forth in claim 1, wherein:

said elastomeric adaptor comprises a hollow cap member adapted to be seated upon an end portion of said metering valve stem and having an axially extending fluidic bore defined therethrough for fluidically connecting said metering valve stem to the tool stem of the tool.

3. A metering valve-tool stem assembly, for use in connection with a fastener-driving tool, for dispensing a predetermined metered amount of fuel from a fuel source into a combustion chamber of the fastener-driving tool, comprising:

a tool stem, having a substantially cylindrical recessed portion defined therein and an internal, frusto-conically configured end wall, adapted to be fixedly mounted upon a fastener-driving tool so as to be fluidically connected to a combustion chamber of the fastener-driving tool;

a metering valve operatively connected at an intake end thereof to a fuel source for dispensing a predetermined metered amount of fuel from the fuel source toward the tool combustion chamber;

a metering valve stem fixedly mounted upon a discharge end of said metering valve and adapted to fluidically cooperate with said tool stem of the fastener-driving tool, wherein said tool stem defines a fluid flow path for delivering the predetermined metered amount of fuel from said metering valve stem, through said tool stem, and into the tool combustion chamber; and an elastomeric adaptor mounted upon said metering valve stem and adapted to be disposed in sealed engagement with said recessed portion of said tool stem of the fastener-driving tool so as to thereby define a sealed fluid flow path leading from said metering valve and toward the tool combustion chamber regardless of relative movements that may occur between said metering valve stem and said tool stem, said elastomeric adaptor comprising a tubular body portion, defined around a longitudinal axis, for disposition within said substantially cylindrical recessed portion of said tool stem, a counterbored region defined within said tubular body portion for housing a forward end portion of said metering valve stem and having a front end wall portion, disposed substantially perpendicular to said longitudinal axis of said tubular body portion, for providing an internal wall surface for abutment with a front end face of said forward end portion of said metering valve stem so as to properly seat said forward end portion of said metering valve stem internally within said counterbored region of said tubular body portion, and a frusto-conically configured, annular edge portion formed upon an external wall surface of said front end wall portion of said tubular body portion for mated engagement with said internal, frusto-conically configured end wall of said tool stem so as to provide a universal sealed interface with said tool stem of the fastener-driving tool regardless of relative movements that may occur between said metering valve stem and said tool stem.

4. The metering valve-tool stem assembly as set forth in claim 3, wherein:

said tool stem comprises an axially extending stem portion having a first end adapted to be fluidically connected to the combustion chamber of the fastener-driving tool, and a head member integrally formed upon a second, opposite end adapted to be fluidically sealed with said elastomeric adaptor mounted upon said metering valve stem.

5. The metering valve-tool stem assembly as set forth in claim 4, wherein:

said axially extending stem portion of said tool stem has an axially extending fluid passageway defined therein; and said head member of said tool stem has said recessed portion defined therein in a counterbored manner, and fluidicically connected to said axially extending fluid passageway defined within said axially extending stem portion of said tool stem, for accommodating said elastomeric adaptor in said fluidically sealed manner.

6. The metering valve-tool stem assembly as set forth in claim 5, wherein:

said counterbored recessed portion defined within said head member of said tool stem has a substantially cylindrical configuration within the vicinity of an entrance region to said counterbored recessed portion, and said internal frusto-conical configuration at a downstream end portion which is fluidically connected to said axially extending fluid passageway defined within said axially extending stem portion.

7. The metering valve-tool stem assembly as set forth in claim 5, wherein:

said elastomeric adaptor comprises a hollow cap member adapted to be seated upon an end portion of said metering valve stem and having an axially extending fluidic bore defined therethrough for fluidically connecting said metering valve stem to said axially extending fluid passageway defined within said axially extending stem portion of said tool stem.

8. A combustion-powered fastener-driving tool, comprising:

a combustion chamber;

a fuel cell containing fuel to be injected into said combustion chamber;

a tool stem, having a substantially cylindrical recessed portion defined therein and an internal, frusto-conically configured end wall, fixedly mounted upon said fastener-driving tool for partially defining a fuel fluid flow path leading toward said combustion chamber of said fastener-driving tool;

a metering valve operatively mounted at an intake end thereof upon said fuel cell for receiving fuel from said fuel cell and for dispensing a predetermined metered amount of fuel from said fuel cell toward said combustion chamber of said fastener-driving tool such that said predetermined metered amount of fuel can be injected into said combustion chamber of said fastener-driving tool;

a metering valve stem fixedly mounted upon a discharge end of said metering valve and adapted to fluidically cooperate with said tool stem of said fastener-driving tool, wherein said tool stem defines a fluid flow path for delivering said predetermined metered amount of fuel from said metering valve stem, through said tool stem, and into said combustion chamber of said fastener-driving tool; and an elastomeric adaptor mounted upon said metering valve stem and adapted to be disposed in sealed engagement with said recessed portion of said tool stem of said fastener-driving tool so as thereby define a sealed fluid flow path leading from said metering valve and toward said tool combustion chamber regardless of relative movements that may occur between said metering valve stem and said tool stem, said elastomeric adaptor comprising a tubular body portion, defined around a longitudinal axis, for disposition within said substantially cylindrical recessed portion of said tool stem, a counterbored region defined within said tubular body portion for housing a forward end portion of said metering valve stem and having a front end wall portion, disposed substantially perpendicular to said longitudinal axis of said tubular body portion, for providing an internal wall surface for abutment with a front end face of said forward end portion of said metering valve stem so as to properly seat said forward end portion of said metering valve stem internally within said counterbored region of said tubular body portion, and a frusto-conically configured, annular edge portion formed upon an external wall surface of said front end wall portion of said tubular body portion for mated engagement with said internal, frusto-conically configured end wall of said tool stem so as to provide a universal sealed interface with said tool stem of said fastener-driving tool regardless of relative movements that may occur between said metering valve stem and said tool stem.

9. The combustion-powered fastener-driving tool as set forth in claim 8, wherein:

said tool stem comprises an axially extending stem portion having a first end adapted to be fluidically connected to said combustion chamber of said fastener-driving tool, and a head member integrally formed upon a second, opposite end adapted to be fluidically sealed with said elastomeric adaptor mounted upon said metering valve stem.

10. The combustion-powered fastener-driving tool as set forth in claim 9, wherein:

said axially extending stem portion of said tool stem has an axially extending fluid passageway defined therein; and said head member of said tool stem has said recessed portion defined therein in a counterbored manner, and fluidically connected to said axially extending fluid passageway defined within said axially extending stem portion of said tool stem, for accommodating said elastomeric adaptor in said fluidically sealed manner.

11. The combustion-powered fastener-driving tool as set forth in claim 10, wherein:

said counterbored recessed portion defined within said head member of said tool stem has a substantially cylindrical configuration within the vicinity of an entrance region to said counterbored recessed portion, and said internal frusto-conical configuration at a downstream end portion which is fluidically connected to said axially extending fluid passageway defined within said axially extending stem portion.

12. The combustion-powered fastener-driving tool as set forth in claim 10, wherein:

said elastomeric adaptor comprises a hollow cap member adapted to be seated upon an end portion of said metering valve stem and having an axially extending fluidic bore defined therethrough for fluidically connecting said metering valve stem to said axially extending fluid passageway defined within said axially extending stem portion of said tool stem.

* * * * *